United States Patent
Davis

(10) Patent No.: US 9,692,598 B2
(45) Date of Patent: Jun. 27, 2017

(54) MULTI-USE LONG STRING AUTHENTICATION KEYS

(71) Applicant: Terry L. Davis, Issaquah, WA (US)

(72) Inventor: Terry L. Davis, Issaquah, WA (US)

( * ) Notice: Subject to any disclaimer, the term of this patent is extended or adjusted under 35 U.S.C. 154(b) by 52 days.

(21) Appl. No.: 14/821,610

(22) Filed: Aug. 7, 2015

(65) Prior Publication Data

US 2017/0041146 A1 Feb. 9, 2017

(51) Int. Cl.
*H04L 9/32* (2006.01)
*H04L 29/06* (2006.01)

(52) U.S. Cl.
CPC .............. *H04L 9/32* (2013.01); *H04L 9/3247* (2013.01); *H04L 63/0876* (2013.01); *H04L 63/10* (2013.01)

(58) Field of Classification Search
CPC ......... H04L 9/32; H04L 9/3247; H04L 63/10; H04L 63/0876
See application file for complete search history.

(56) References Cited

U.S. PATENT DOCUMENTS

| | | | | |
|---|---|---|---|---|
| 6,094,487 | A * | 7/2000 | Butler | H04L 9/321 380/270 |
| 8,868,915 | B2 * | 10/2014 | Counterman | G06F 21/335 713/176 |
| 2004/0015695 | A1 | 1/2004 | de Queiroz | |
| 2004/0181674 | A1 | 9/2004 | Theimer | |
| 2006/0088166 | A1 * | 4/2006 | Karusawa | H04L 9/3226 380/277 |
| 2008/0076402 | A1 * | 3/2008 | Jeong | G06Q 30/02 455/422.1 |
| 2011/0265176 | A1 * | 10/2011 | Khosrowpour | G06F 12/1458 726/19 |
| 2012/0131650 | A1 | 5/2012 | Gutt et al. | |
| 2012/0272336 | A1 * | 10/2012 | Cohen | G06F 21/10 726/28 |
| 2012/0297470 | A1 * | 11/2012 | Kwon | H04L 9/083 726/7 |
| 2012/0323717 | A1 | 12/2012 | Kirsch | |

(Continued)

OTHER PUBLICATIONS

"International Search Report and Written Opinion" for PCT Application No. PCT/US2016/045762 mailed Oct. 13, 2016, 9 pages.

*Primary Examiner* — Michael Pyzocha
(74) *Attorney, Agent, or Firm* — Han Santos, PLLC

(57) ABSTRACT

An authentication system that uses a multi-use long string authentication key to authenticate client device access to protected resources, is presented. The authentication system is based on a shared knowledge of long string authentication key. The authentication key is used as a platform to derive digital signatures for access to protected resources. One or more authentication parameters can be used in combination with the authentication key to derive or validate digital signatures. The one or more authentication parameters can include a key index parameter, a key offset parameter, and a key length parameter. The digital signatures derived from authentication keys can be used to control access to various types of protected resources such as, digital house, a vehicle fob key, a remote garage door opener, a hotel room card key, credit or debit cards magnetic strip or chip, online financial accounts, computer or control systems, or website authentication.

20 Claims, 9 Drawing Sheets

(56) References Cited

U.S. PATENT DOCUMENTS

| | | | |
|---|---|---|---|
| 2013/0007846 A1* | 1/2013 | Murakami | H04W 12/08 726/4 |
| 2013/0046971 A1* | 2/2013 | Lu | H04L 65/1016 713/155 |
| 2013/0275656 A1* | 10/2013 | Talagala | G06F 12/0246 711/103 |
| 2014/0104638 A1* | 4/2014 | Kato | H04N 1/44 358/1.14 |
| 2014/0289833 A1 | 9/2014 | Briceno et al. | |
| 2014/0304837 A1* | 10/2014 | Mogaki | G06F 21/33 726/28 |
| 2015/0067784 A1* | 3/2015 | Lee | H04L 63/08 726/4 |
| 2015/0188701 A1 | 7/2015 | Nordholt et al. | |
| 2015/0222615 A1* | 8/2015 | Allain | H04L 63/08 726/4 |
| 2016/0057130 A1* | 2/2016 | Mihaylov | H04L 63/0815 726/8 |

* cited by examiner

MULTI-USE LONG STRING AUTHENTICATION KEYS

BACKGROUND

Throughout history, keys have provided an inexpensive, though imperfect, method of access control to physical properties such as buildings, vehicles, containers, safes, and the like. Physical keys use unique authentication geometries to operate a specifically paired-lock or a small number of specifically paired-locks. Current methods of generating key authentication geometries are governed by efficiency requirements that focus on fabricating, managing and storing individual key solutions. However, the sheer proliferation of personal items requiring access control raises concerns over unintended key duplication. In more recent times, the advent of a fob key has somewhat eased those concerns. Fob keys include small security hardware devices that use a built-in digital signature. However, the methodology of generating digital signatures has been developed with the same reasoning as their predecessor technologies; namely to allow for an efficient means to fabricate, manage and store individual key solutions. As a result, with the ever-increasing number of physical items requiring access control, concerns over unintended duplication of digital signatures is becoming more prevalent.

SUMMARY

This disclosure describes systems and methods for implementing an authentication technique using multi-use long string authentications keys. The multi-use long string authentication keys, hereinafter "authentication key," can provide a computationally efficient method of authenticating access to protected resources. The authentication technique is based on a shared knowledge of an authentication key. The authentication key is used as a platform to derive digital signatures that authenticate a client device for access to protected resources. The character length of digital signatures can be designed to accommodate an authentication need, a required level of security, a device size, and/or a size of the authentication key. The authentication key may vary in size from a few bits to terabytes or petabytes in length. The digital signatures derived from authentication keys can be used to control access to various types of protected resources such as, but not limited to, a digital access mechanism for a residential or commercial building, a vehicle fob key, a remote garage door opener, a hotel room card key, credit or debit cards magnetic strip or chip, online financial accounts, computer or control systems, or website authentication. In various examples, a protected resource may comprise of any "physical resource" or "digital resource" that may control access.

This Summary is provided to introduce a selection of concepts in a simplified form that are further described below in the Detailed Description. This Summary is not intended to identify key features of the claimed subject matter, nor is it intended to be used as an aid in determining the scope of the subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference number in different figures indicate similar or identical items.

In FIG. 1A, a client device transmits an authentication request to a protected resource that includes an authentication system. In FIG. 1B, the client device transmits an authentication request to an authentication system that is independent of the protected resource.

In FIG. 2A, a digital signature is derived using an authentication key and authentication parameters that include a key index parameter, and a key length parameter. In FIG. 2B, a digital signature is derived using an authentication key and authentication parameters that include a key index parameter, a key length parameter, and a key offset parameter.

FIG. 6 further describes determining access privileges using a key index table.

DETAILED DESCRIPTION

Figure 1A:
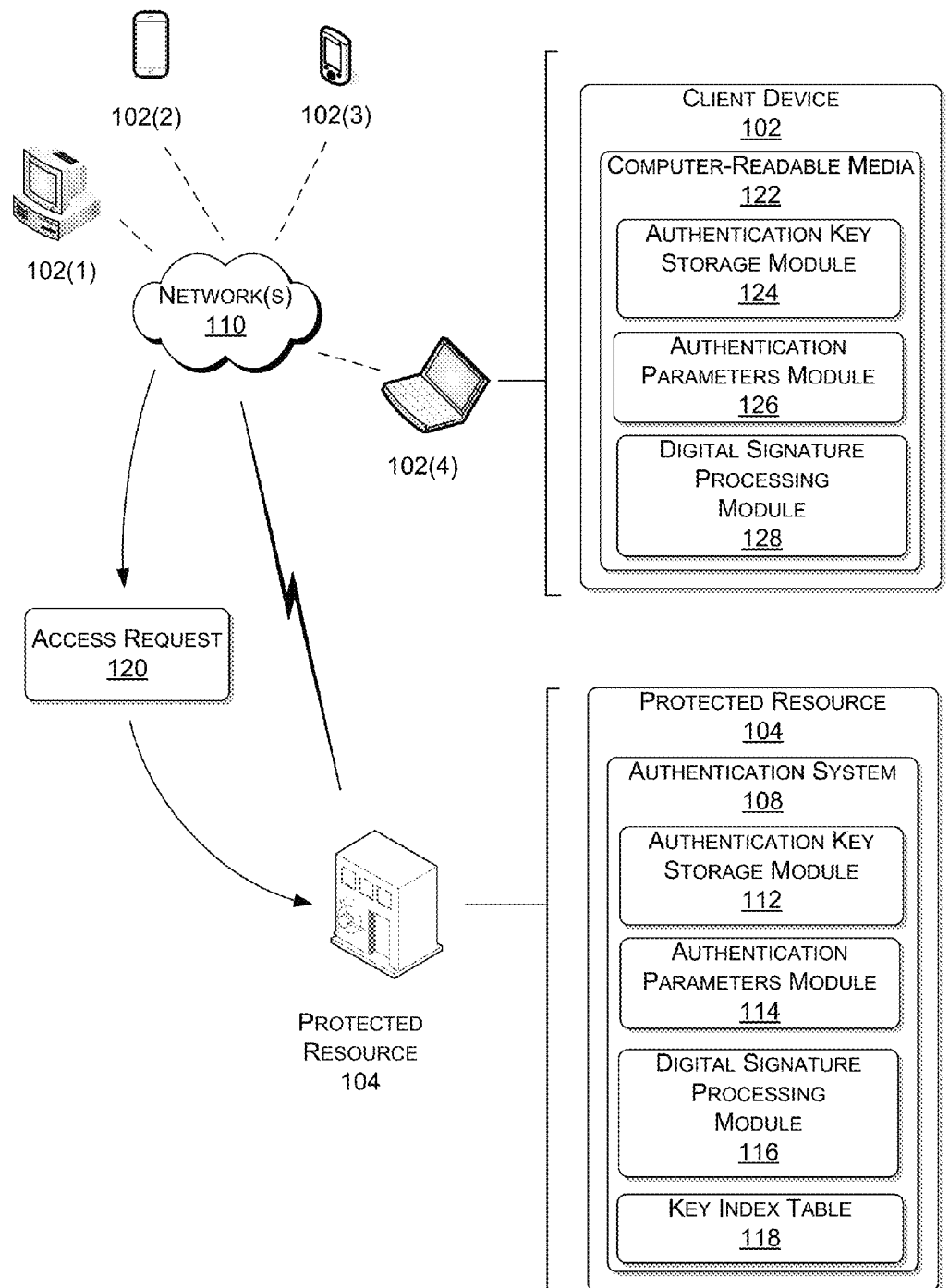
FIGS. 1A and 1B illustrate example implementations of a client device requesting access to a protected resource using a multi-use long string authentication key.

This disclosure provides a multi-use digital authentication scheme that provides client devices with access to protected resources. The authentication scheme is based on a shared knowledge of a long string authentication key between an authentication system and a client device. The authentication key is used as a platform to derive digital signatures that authenticate individual client devices for access to protected resources. In some examples, digital signatures may be associated with a restricted type of access to the protected resource. In other examples, the digital signatures may be associated with unrestricted access to the protected resource.

The authentication key can be generated by any method that can produce a long string of random characters. The term "long string" as used herein describes a specific number of characters of an authentication key that is equal to or exceeds a number of characters associated with a digital signature. That is, as a non-limiting example, a digital signature may comprise of five characters or five bits in length. In this instance, a corresponding "long string" authentication key may constitute six characters or six bits. As described here, a long string can be defined by a specific number of characters or a specific number of bits. In some examples, the authentication key is initially derived by a client device and shared with an authentication system. In other examples, the authentication key is derived by the authentication system and shared with the client device. In various examples, the authentication key can be generated using a mathematical random number generator. In other examples, the authentication key can be generated by coding environmental data, such as, but not limited to, background radiation, background noise from a particular geolocation (i.e. busy street), physical baseband spectrum noise, and sunlight wavelength. In other examples, an individual user of a client device can generating the authentication key by coding individual pixels in a particular digital photo, a specific text from a particular publication, or an audio excerpt from particular composition or digital recording. In other words, the authentication key can be generated by any means that digitally encodes a long string of characters that is unique to a moment in time, an environmental condition, or an individual user.

In response to generating an authentication key, the authentication key can be shared between the client devices requesting access to a protected resource and the authentication system that controls access to the protected resource. In doing so, the authentication key becomes the common platform by which one or more unique digital signatures can be derived.

In various examples, a particular authentication key can be used as a common platform to derive unique digital signatures for multiple protected resources. As a non-limiting example, a single authentication key may be associated with a client device and the authentication key can be used to derive digital signatures for a range of protected resources, such as, but not limited to, commercial and residential building access, vehicle access and operation, and access to financial resources. In other examples, a particular authentication key may be associated with one protected resource, and multiple authentication keys may be used to access a corresponding multiple number of protected resources.

In various examples, a request to access a protected resource is accompanied by a client device identifier. The client device identifier can be used by the authentication system to identify an authentication key that corresponds to the client device. In some examples, an authentication system may be tasked with authenticating access of several, if not millions of users. In this instance, a client device identifier can efficiently identify a particular authentication key from multiple (e.g., millions) of authentication keys, thus streamlining the authentication process. Note that a same client device may share multiple authentication keys with an authentication system. Thus by extension, a same client device may have multiple client device identifiers. This is because each authentication key associates a particular client device with a particular protected resource. If a client device accesses multiple protected resources, then each protected resource will likely have its own unique authentication key. Thus, the client device may likely retain multiple client device identifiers to identify the particular authentication key that corresponds to a particular protected resource.

In various examples, a request to access a protected resource can also include a request to exercise different access privileges. For example, one or more digital signatures may be associated with a single protected resource, with each digital signature corresponding to a different access privilege. In a non-limiting example, consider access requests received by a financial institution. An access request may involve accessing balance information of financial resources held within the financial institution. Alternatively, an access request may involve performing financial transactions using those same financial resources. In this example, two different digital signatures may be associated with the financial institution to separately provide access to balance information and perform financial transactions. In another example, the protected resource may correspond to a hotel room. In this example, different digital signatures may be associated with different entities, such as, hotel guests, housekeeping, a front desk manager, and a hotel manager. Thus, a particular access privilege may be associated with each of the hotel guests, housekeeping, front desk manager, and hotel manager. For instance, a digital signature may associate hotel room access for housekeeping during particular working hours.

In another example, the protected resource may correspond to a vehicle, and different digital signatures may be associated with different levels of vehicle access. For example, a first digital signature may grant vehicle access during daylight hours, while a second digital signature may allow unlimited vehicle access.

In other examples, the protected resource may correspond to a residential building, a commercial building, or an industrial complex such as power grid sub-stations. Accordingly, different digital signatures may be associated with maintenance personnel, security personnel, and building residents. Accordingly, each digital signature may be associated with a different level of access. For instance, maintenance personnel and security personnel may be afforded temporal building access, whilst building residents may be afforded unlimited access.

In another example, the protected resource may correspond to an aircraft or an unmanned aerial vehicle (UAV), and different digital signatures may correspond to different entities that exercise control over the aircraft or UAV. These entities may include an airport control tower, the federal aviation administration (FAA), and maintenance personnel. Accordingly, the different digital signatures may be associated with different levels of control over aircraft systems for each of the entities.

In yet another example, the protected resource may correspond to a business, government, or private or public computing system. Accordingly, different digital signatures may be associated with access privileges associated with employees, customers, partners, etc.

In various examples, the request to access a protected resource can also include one or more authentication parameters. The one or more authentication parameters can be used to derive or validate a digital signature from an authentication key. The one or more authentication parameters can include, but are not limited to, a key index parameter, a key offset parameter, and a key length parameter. The one or more authentication parameters are described in more detail below in FIG. 2.

In various examples, a request to access a protected resource can include different combinations of the information. In one non-limiting example, an access request may include a client device identifier, one or more authentication parameters, a digital signature, and a particular type of access request. In this example, the authentication system can use the client device identifier to identify a corresponding authentication key that is stored within the authentication system. The one or more authentication parameters can then be used to derive a digital signature from the identified authentication key. The authentication system may also verify that the derived digital signature matches the digital signature that accompanied the request. In response to verifying that both digital signatures match, the authentication system can grant the client device the access to the protected resource based on the type of access requested. A flow chart of this example authentication scheme is described in more detail in FIG. 5.

In another example, a request to access a protected resource can include a client device identifier and one or more authentication parameters. In this example, the authentication system can use the client device identifier to identify a corresponding authentication key stored within the authentication system. The one or more authentication parameters can then be used to derive a digital signature from the identified authentication key. The authentication system may also compare the derived digital signature to an index table of digital signatures that are stored within the authentication system. In doing so, the authentication system can validate an authenticity of the derived digital signature and identify a corresponding access request (e.g., opening a vehicle door or starting a vehicle engine) that is associated with the digital signature. A flow chart of this example authentication scheme is described in more detail in FIG. 6.

In some examples, rather than using one or more authentication parameters to derive a digital signature from an authentication key, the entire authentication key may itself constitute a digital signature. In this instance, a request to access a protected resource need only include a client device identifier and an authentication key. Here, the authentication system may use the client device identifier to identify a corresponding authentication key stored within the authentication system. Access to the protected resource is then based on a comparison of the authentication key provided with the access request and the corresponding authentication key stored within the authentication system.

In some examples, a request to access a protected resource can include a client device identifier and a request for a particular type of access. In this example, the authentication system can use the client device identifier to identify a corresponding authentication key stored within the authentication system. The authentication system may also determine one or more authentication parameters and derive a digital signature based on the one or more authentication parameters. In doing so, the authentication system may transmit an indication to a client device requesting a digital signature based on the one or more authentication parameters. In response, the client device can reply with a derived digital signature, to which the authentication system can determine whether to grant access to the protected resource. A flow of this example authentication scheme is described in more detail in FIG. 7.

A technical advantage of performing an authentication using an authentication key and one or more authentication parameters is that the number of possible authentication combinations is infinitely greater than traditional mechanisms of performing digital authentication. Further, the authentication process disclosed herein allows either party, the client device or the authentication system, to change a digital signature if that party believes the security of the digital signature has been comprised. For example, since both the client device and the authentication system share the same authentication key, each party has the same ability to derive the same digital signature from the authentication key, provided that each party uses the same authentication parameters. Therefore, either party can elect to change a digital signature, and need only provide the other party with the one or more authentication parameters that correspond to the new digital signature. Therefore, in circumstances where security measures have been comprised, an affected party need not wait for the other party to change a digital signature.

Moreover, an additional advantage of the authentication technique disclosed herein is that the authentication key is encoded as machine-readable data from random data (i.e. random numbers, environmental data or personal data) that is shared only between the client device and the authentication system. In doing so, the protected resources is provided with an additional level of protection because the computational impracticability of duplicating the authentication key.

In various examples, the authentication techniques described herein can facilitate access control for protected resources that include, without limitation, a digital access mechanism for a residential or commercial building, a vehicle fob key, a remote garage door opener, a hotel room key, and credit or debit financial accounts. Other examples, include control systems, software applications, website based applications, or any other computing system or application that relies on digital authentication.

FIG. 1A illustrates an example implementation of client device(s) 102 requesting access to a protected resource 104. In some examples, the protected resource 104 can include, but is not limited to, vehicles, buildings, garage doors, financial accounts at banking institutions, and computing system applications.

In the illustrated example, FIG. 1A depicts an authentication system 108 that is integrated with a protected resource 104. The authentication system 108 can include one or more modules, such as an authentication key storage module 112, an authentication parameters module 114, a digital signature processing module 116, and a key index table 118. The authentication key storage module 112 can store one or more authentication keys with associated client identifiers. Each authentication key and associated client identifier can correspond to different client devices 102. The authentication parameters module 114 can store one or more authentication parameters, which may be transmitted to a client device(s) 102 as part of a request to the client device(s) 102 to provide a digital signature. The digital signature processing module 116 can derive a digital signature from a stored authentication key using one or more authentication parameters that are provided with an access request 120. The key index table 118 can be used to correlate derived digital signatures with access privileges associated with the protected resource 104. The above referenced modules of the authentication system 108 are described in more detail below with reference to FIG. 3.

In the illustrated example, FIG. 1A depicts a diverse variety of client device(s) 102 such as laptop computers, tablet computers, or cellular phones, but the client device(s) 102 are not limited to a particular type of device. Client device(s) 102 further comprises computer-readable media 122 that include one or more modules that include, but are not limited to, an authentication key storage module 124, an authentication parameters module 126, and a digital signature processing module 128. The authentication key storage module 124 can store one or more authentication keys that are associated with different protected resources, such as the protected resource 104. The authentication parameters module 126 can store one or more authentication parameters, which can form part of an access request 120 to an authentication system 108. The digital signature processing module 128 can derive a digital signature from a stored authentication key using one or more authentication parameters. The above referenced module of the client device(s) 102 are described in more detail below with reference to FIG. 4.

The client device(s) 102 and the authentication system 108 can communicate via one or more networks 110. The one or more networks 110 can include public networks such as the Internet, or private networks such as an institutional and/or personal intranet, or some combination of private and public networks. Networks can include any type of wired or wireless network, including but not limited to local area network (LANs), wide area networks (WANs), satellite networks, cable networks, Wi-Fi networks, WiMax networks, mobile communication networks (e.g. 3G, 4G, and so forth), Bluetooth, or near field communication (NFC) networks, or any combination thereof.

Figure 1B:
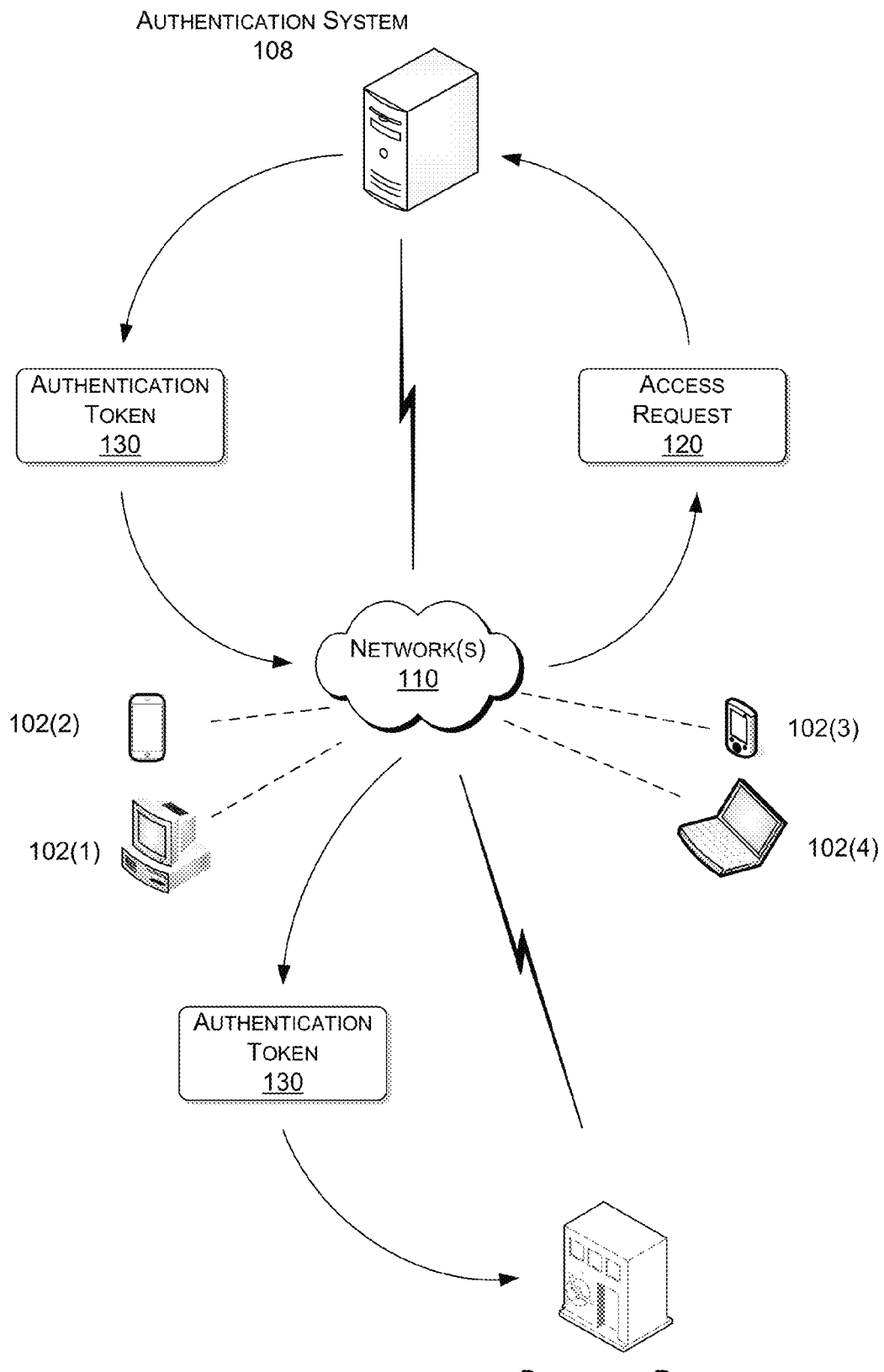

FIG. 1B illustrates the authentication system 108 operating independently of the protected resource 104. The authentication system 108 can communicate with the client device(s) 102 and the protected resource 104 via one or more networks (110). In this example, the authentication system 108 receives an access request 120 from a client device(s) 102 via one or more networks 110. Once the authentication system 108 verifies the authenticity of the access request 120, the authentication system 108 can transmit an authentication token 130 to the client device(s) 102. The client device(s) 102 can then use the authentication token 130 to access the protected resource 104. In some examples, the authentication token 130 may comprise encrypted data, such as an identifier of the protected resource 104, an identifier of the authentication system 108, or an identifier of the client device(s) 102. The protected resource 104 may authenticate the authentication token 130 by decrypting the token with a cryptographic key, and verifying the corresponding identifier as provided.

Figure 2A:
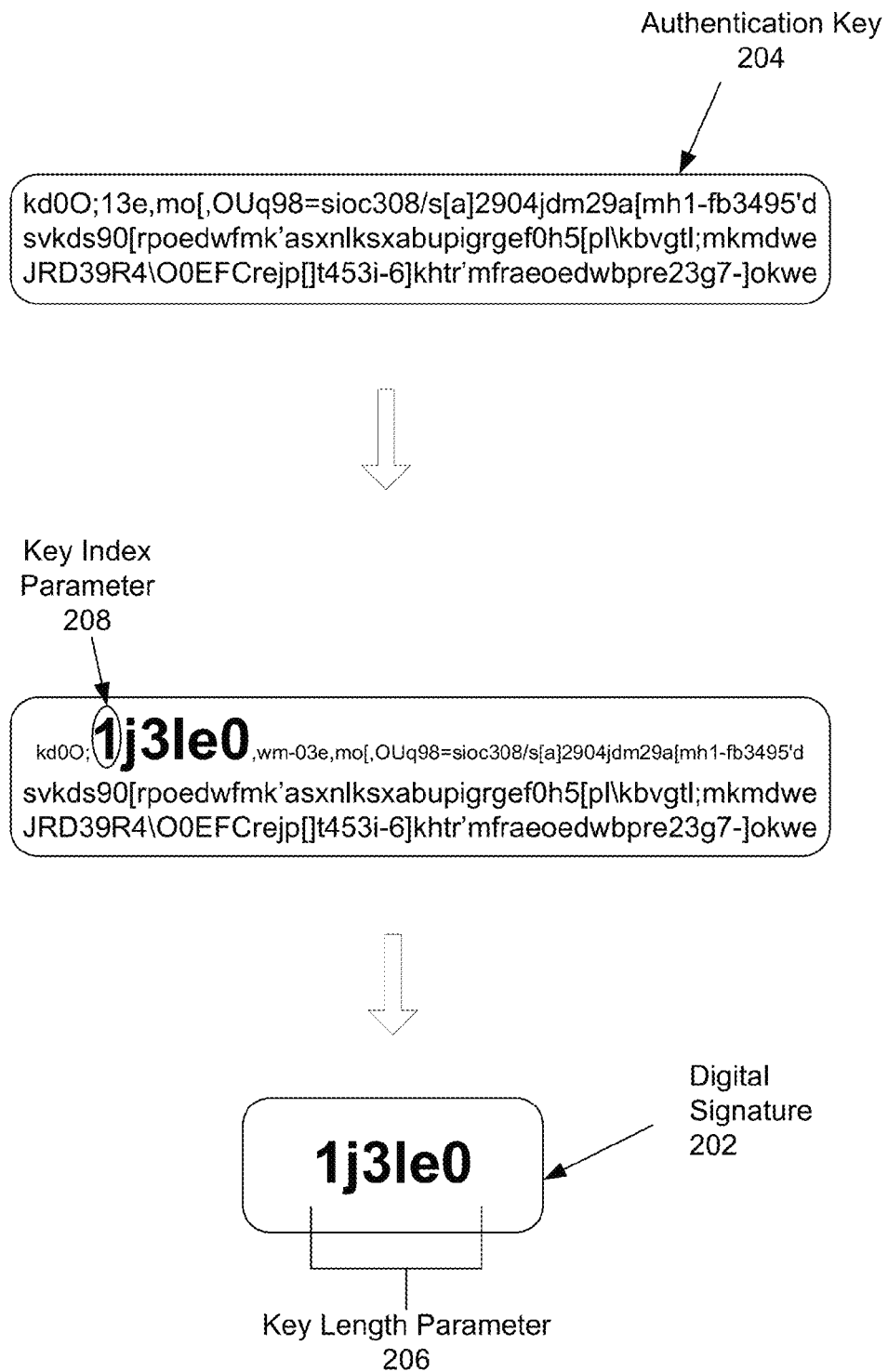
FIGS. 2A and 2B illustrate authentication techniques used to derive a digital signature from an authentication key.
Figure 2B:
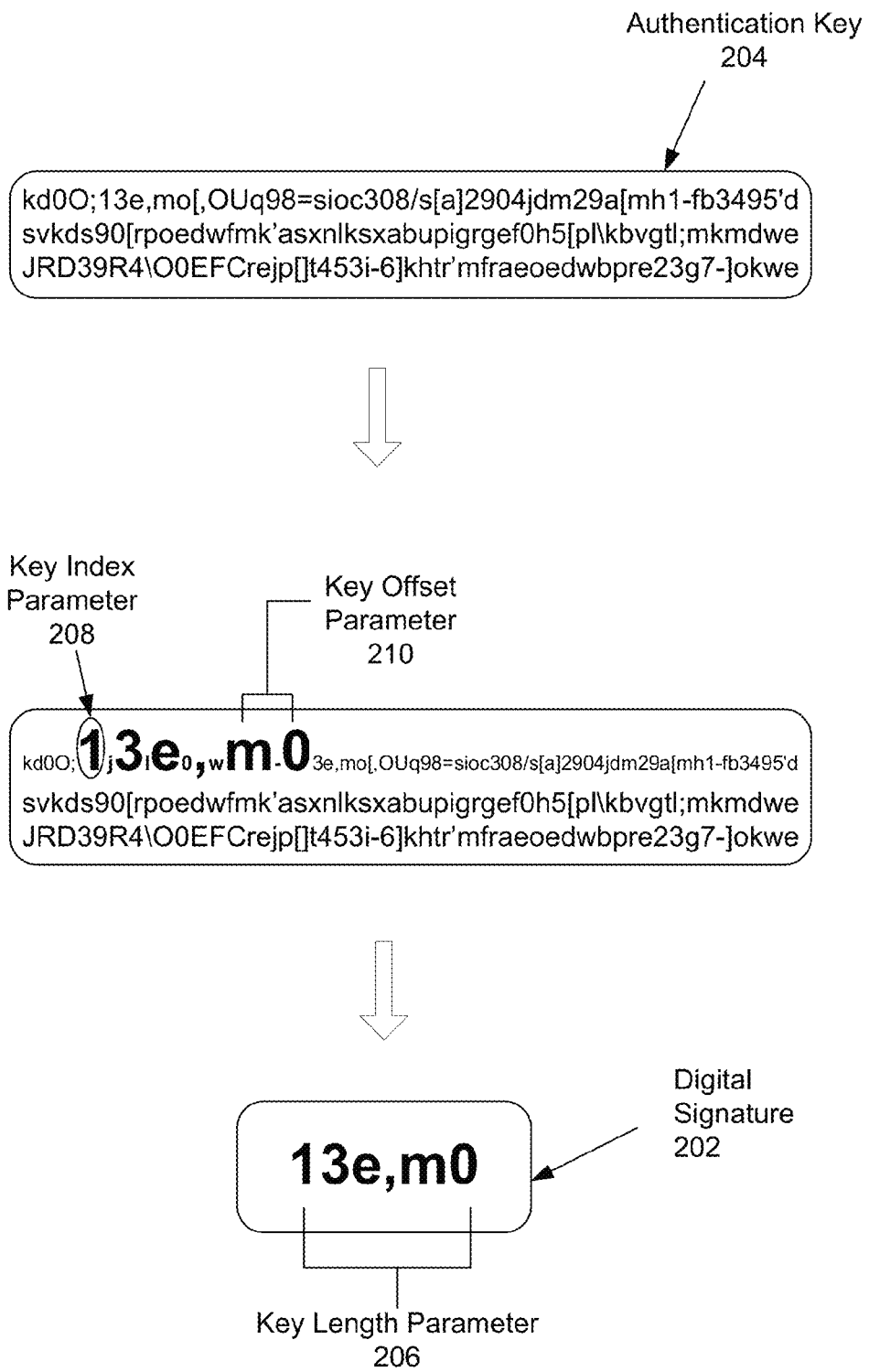

FIGS. 2A and 2B illustrate a use of one or more authentication parameters to derive a digital signature 202 from an authentication key 204. The authentication key 204 can be generated by any method that can produce a long string of random characters. As noted earlier, a "long string" as used herein describes a specific number of characters that define an authentication key that is equal to or exceeds a number of characters associated with a digital signature. The authentication key 204 can be created and used in any format, such as, but not limited to bits, bytes, hexadecimal, ASCII, and Unicode. The length of the authentication key 204 can vary from a few bits, bytes to terabytes, petabytes, and beyond. As a non-limiting example, a four byte authentication key 204 has four billion potential combinations, making a brute force attempt to trial various digital signature combinations computationally burdensome. In some examples, the authentication system can also instigate a time delay of two or more seconds which can reduce a number of potential attempts to less than 45,000 per day. Further, the length of the authentication key 204 can be based on an architect's security requirements and system capabilities. In some examples, the authentication key 204 can be of a fixed size. In other examples, the authentication key 204 can be of variable length based on the security requirements of the authenticating system.

In various examples, the authentication key 204, comprising machine readable data, can be generated by an alpha-numeric coding by a mathematical random number/character generator. In other examples, the authentication key 204, comprising machine readable data, can be generated by an alpha-numeric coding of environmental data, such as, but not limited to, background radiation, background noise from a particular geolocation (i.e. busy street), physical baseband spectrum noise, and sunlight wavelength. In other examples, the authentication key 204 can be generated by coding individual pixels in a particular digital photo, a specific text from a particular publication, or an audio excerpt from particular composition or digital recording. In other words, the authentication key 204 of character can be generated by any means of digitally coding a long string of characters that are unique to a moment in time, an environmental condition, or an individual user. In some examples, the authentication key 204 is derived by a client device and shared with an authentication system. In other examples, the authentication key 204 is derived by the authentication system and shared with the client device. The authentication key 204 can be derived by one or more hardware sensors associated with the client device or the authentication system. The hardware sensors can include, but are not limited to a microphone, global positioning system, optical sensor, and radiation sensor.

In the illustrated example, a digital signature 202 can be derived from the authentication key 204 using one or more authentication parameters. The digital signature 202 is derived by processing the machine readable data of the authentication key 204 using the one or more authentication parameters. The one or more authentication parameters can include, a key length parameter 206, a key index parameter 208, a key offset parameter 210, and in some cases where more complex and higher security implementations are required, a randomizer parameter 212.

In the illustrated example, the key length parameter 206 can include a numerical value that denotes the number of characters that make up the digital signature 202. For example, a key length parameter 206 of three hundred reflects a digital signature 202 of three hundred characters. The key length parameter 206 can include any numerical value that is equal to or lesser than the character length of an authentication key 204. In some examples, the key length parameter 206 may be determined by the anticipated total number uses of the digital signature 202. For example, consider a digital signature 202 that is to be implemented as part of a vehicle fob key. An architect of the digital signature 202 may determine that a vehicle is accessed approximately eight times a day for twenty years. If a digital signature 202 having a four byte character length is assigned to the vehicle fob key, an authentication key 204 length of 233,600 bytes (i.e. 4 bytes×8 uses per day×365 days per year×20 years) is required. Current computing technology can adequately facilitate a 233 kb storage requirement. In FIG. 2A, the illustrated key length parameter 206 is six bytes, meaning that the character length of the digital signature 202 is six characters, those being "1j3le0".

In the illustrated example, the key index parameter 208 identifies a character position within the authentication key 204 that corresponds to a first character of the digital signature 202. In the illustrated example, the key index parameter 208 is six. Therefore, the first character of the digital signature 202 is the sixth character of the authentication key 204.

In various examples, the key index parameter 208 can be used to vary a digital signature 202 after a predetermined period of time. In some examples, a change in the key index parameter 208 can be based on algorithm shared between a client device and the authentication system. As a non-limiting example, consider a digital signature that is to change on a daily basis for a single day authentication. In this example, determining a new digital signature each day can be implemented by modifying the key index parameter 208 by an independent parameter. In one example, the independent parameter can be the current date. For example, a date of Aug. 7, 2015 can coded as a key index parameter 208 of "872015," meaning that the first character of the digital signature 202 is located at an index position of 872,015 of the authentication key 204. In other examples, the key index parameter 208 can be determined by an integer (i.e. 1 to n), or algorithmically in an index key table shared between a client device and the authentication system. Depending on design needs, the client device or the authentication system can provide the key index parameter 208.

In FIG. 2B, the illustrated example includes a key offset parameter 210. The key offset parameter can include a numerical value that identifies a next character of the digital signature 202 within the authentication key 204. In the illustrated example, the key offset parameter 210 corresponds to "two." In this example, a subsequent character in a digital signature 202 is identified as being offset by two character positions from the last identified character position within the authentication key 204. Therefore, when combined with a key length parameter 206 and a key index parameter 208, the digital signature in FIG. 2B corresponds to "13e,m0".

In other examples, the key offset parameter 210 can be determined by a formula that identifies a subsequent character position. As a non-limiting example, consider a key offset formula of "2x" where x is the "hour" of a day during which an access request is received by the authentication system. In this example, the access request received at 9 am can be used to determine a key offset parameter 210 of "18" (i.e. 2× 9). In some examples, the key offset parameter 210 can be determined by an integer (i.e. 1 to n), or algorithmically from a key offset parameter 210 index table that is shared between a client device and the authentication system. Depending on design needs, the client device or the authentication system can provide the key offset parameter 210.

In various examples, an additional randomizer parameter can be included. In various examples of high security implementations, a client device can use a randomizer variable or function to shuffle a digital signature 202 prior to sending the digital signature 202 to the authenticating system. In doing so, the authenticating system may re-sequence the digital signature 202 using a complementary randomizer variable or function. In this example, if an authentication process is compromised during a transmission between a client device and the authentication system, then the compromising party still requires the randomizer variable or function in order to discern the digital signature 202.

In various examples, the use of a randomizer variable or function can provide additional security measures to complex and high security implementations, such as those performed by banking institutions. In this example, a request to transfer electronic payments that debit or credit financial resources can be accompanied by a randomizer variable or function. Similarly, a randomizer variable or function can be used in the context of a power grid control sub-station, where generators are placed on or off the grid, and where grid circuit breakers are opened or closed.

In various examples, either one of the client device or the authentication system can change the digital signature 202 at any point in time. A change to the digital signature 202 can be performed by changing any one or more of the authentication parameters. Once the client device or the authentication system has changed a digital signature 202, the client device or the authentication system need only communicate the altered authentication parameters. In doing so, the changed digital signature 202 can be reproduced using the altered authentication parameters, without a need for communicating the altered digital signature itself.

In some examples, the change in the digital signature 202 can also be performed by changing the authentication key 204 itself. In doing so, the client device or the authentication system that instigated the change to the authentication key 204 may communicate the changed authentication key 204 to the other party.

Figure 3:
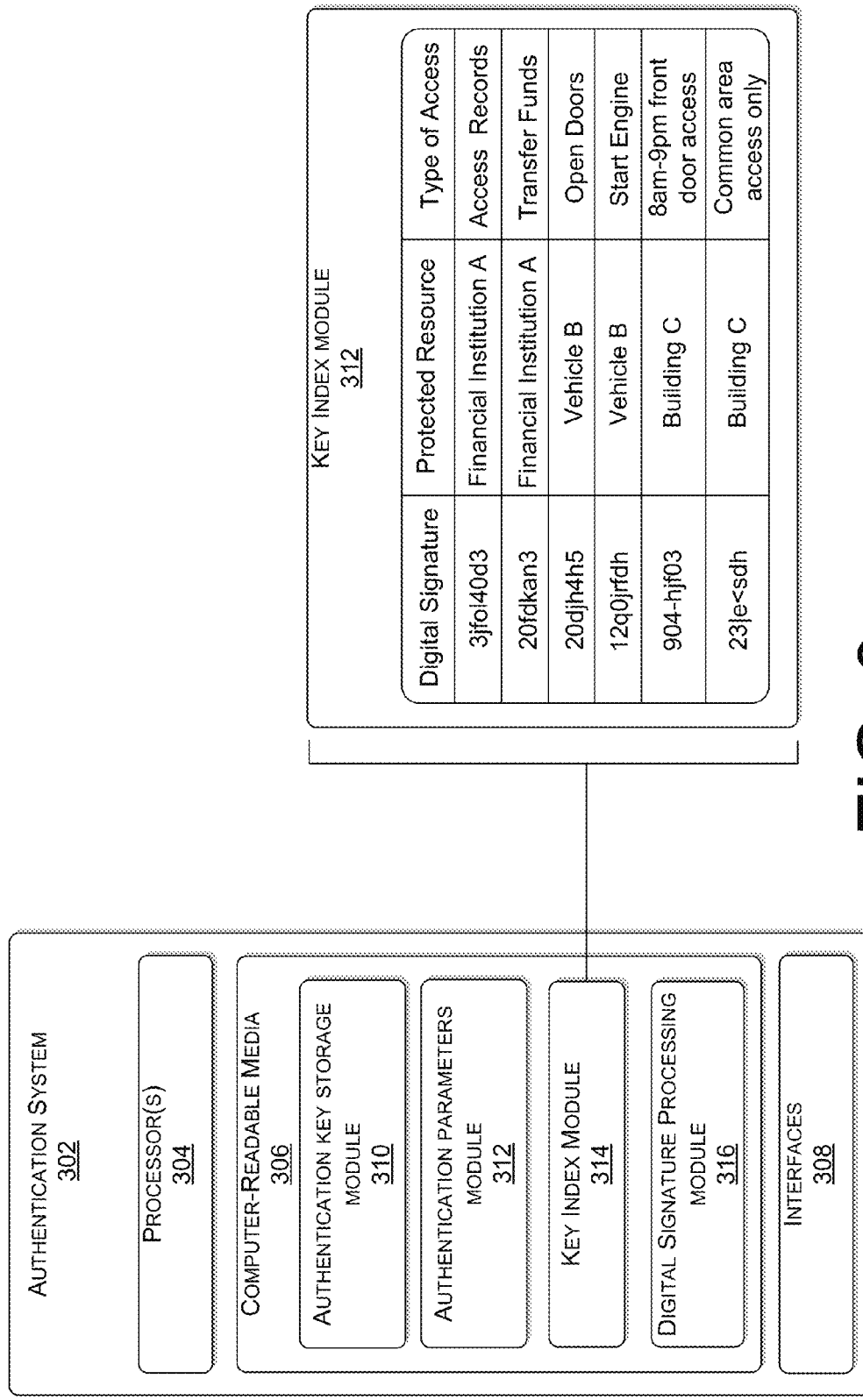
FIG. 3 illustrates an example architecture of an authentication system that controls access to a protected resource.

FIG. 3 illustrates an example architecture of an authentication system 302 that controls access to a protected resource. In some examples, the authentication system 302 can operate independently of the protected resource and communicate with the protected resource via one or more networks. In other examples, the authentication system 302 can be included as part of the protected resource.

In various examples, the authentication system 302 can include one or more processors 304 operably connected to computer-readable media 306. The authentication system 302 can also include one or more interfaces 308 that enable communication with other networked devices, such as a client device. The one or more network(s) can include public networks such as the Internet, private networks such as an institutional and/or personal intranet, or some combination of private and public networks. Network(s) can also include any type of wired and/or wireless network, including but not limited to local area network (LANs), wide area networks (WANs), satellite networks, cable networks, Wi-Fi network, WiMax networks, mobile communications networks (e.g. 3G, 4G, and so forth), Bluetooth or near field communication (NFC) networks, or any combination thereof.

The computer-readable media 306 may include volatile memory (such as RAM), non-volatile memory, and/or non-removable memory, implemented in any method or technology for storage of information, such as computer-readable instructions, data structures, program modules, or other data. Some examples of storage media that may be included in the computer-readable media include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by a computing device.

In contrast to computer-readable media 306, communication media may embody computer-readable instructions, data structures, program modules, or other data in a modulated data signal, such as a carrier wave, or other transmission mechanism. As defined herein, computer-readable media 306 does not include communication media. That is, computer-readable media 306 does not include communications media consisting solely of a modulated data signal, a carrier wave, or a propagated signal, per se.

In some embodiments, the computer-readable media 306 can include an authentication key storage module 310, a key index module 314, and a digital signature processing module 316.

In various examples, the authentication key storage module 310 can store authentication keys that correspond to a plurality of client devices. Each authentication key can be identified by a client device identifier. In some examples, in response to receiving an access request from a client device, the authentication system 302 can use the client device identifier that accompanies the access request to identify the authentication key that is associated with the client device.

In various examples, the authentication system 302 can authenticate an access request by sending a client device one or more authentication parameters and requesting a digital signature in return. The one or more authentication parameters can be stored within an authentication parameters module 312 within the authentication system 302. The authentication parameters module 312 can store authentication parameters such as, a key index parameter, a key offset parameter, a key length parameter, and a randomizer variable or function. In this example, the authentication system 302 may process a returned digital signature to determine whether to grant the client device access to the protected resource. Since the authentication system 302 and the client device share the same authentication key, the authentication system 302 need only provide the client device with the one or more authentication parameters from the authentication parameters module 312. An advantage of this type of authentication process is that the authentication system 302 can change a digital signature at any time without requiring interaction with the client device.

In various examples, authentication of an access request can be performed using a key index module 314. The key index module 314 can store a key index table that associates one or more digital signatures to a protected resource. The key index table can also associate a particular type of access to the protected resource. In the illustrated example in FIG. 3, the digital signature "12q0jrfdh" is associated with Vehicle B (i.e. protected resource), and provides a type of access that corresponds to "start engine." FIG. 3 also illustrates another example, in which a different digital signature "20djh4h5" is associated with the same Vehicle B, however access is limited to only "Open Doors." In a non-limiting example, the authentication system can verify the digital signature associated with an access request, and then using the key index table, identify the relevant protected resource and the associated type of access that is permitted.

In various examples, the digital signature processing module 316 can derive a digital signature using an authentication key and one or more authentication parameters. In some examples, the digital signature processing module 316 can compare the derived digital signature to a digital signature received with an access request. In some examples, the digital signature processing module 316 can compare a derived digital signature to digital signatures stored within the key index module 314. In other examples, the digital signature processing module 316 can perform a combination of comparing a derived digital signature to a digital signature that accompanies an access request, and a digital signature that is stored within the key index module 314.

Figure 4:
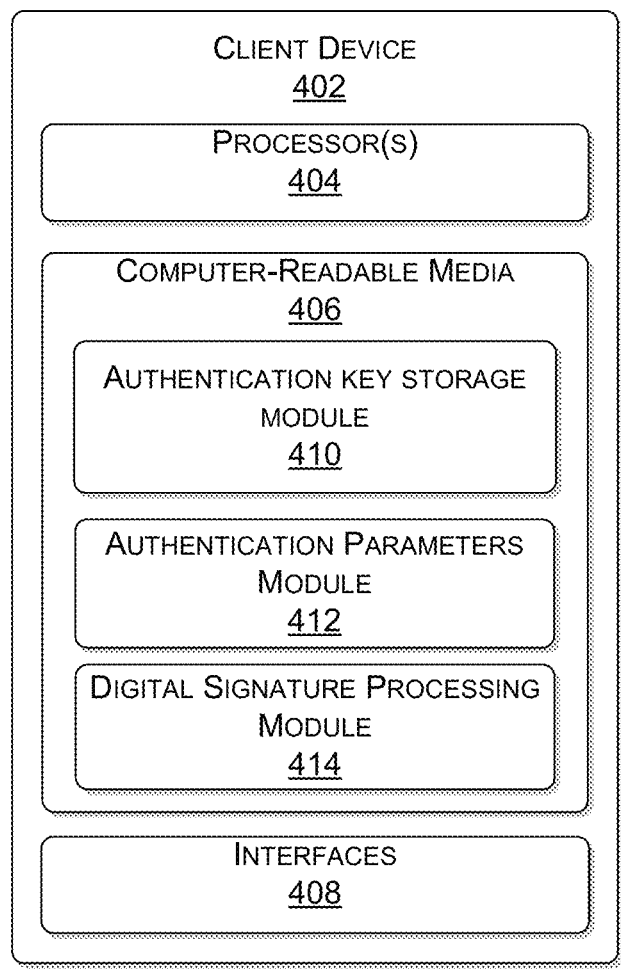
FIG. 4 illustrates an example architecture of a client device that requests access to a protected resource using a multi-use long string authentication key.

FIG. 4 illustrates an example architecture of a client device 402 that requests access to a protected resource using an authentication key. In various examples, the client device 402 can include one or more processors 404 operably connected to computer-readable media 406. The client device 402 can also include one or more interfaces 408 that enable communication with other networked devices, such as a protected resource or an authentication system. The one or more network(s) can include public networks such as the Internet, private networks such as an institutional and/or personal intranet, or some combination of private and public networks. Network(s) can also include any type of wired and/or wireless network, including but not limited to local area network (LANs), wide area networks (WANs), satellite networks, cable networks, Wi-Fi network, WiMax networks, mobile communications networks (e.g. 3G, 4G, and so forth), Bluetooth or near field communication (NFC) networks, or any combination thereof.

The computer-readable media 406 may include volatile memory (such as RAM), non-volatile memory, and/or non-removable memory, implemented in any method or technology for storage of information, such as computer-readable instructions, data structures, program modules, or other data. Some examples of storage media that may be included in the computer-readable media include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by a computing device.

In contrast to computer-readable media 406, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

In some embodiments, the computer-readable media 406 can include an authentication key storage module 410, an authentication parameters module 412, and a digital signature processing module 414.

The authentication key storage module 410 can store authentication keys that correspond to a plurality of protected resources. Each authentication key can be identified by a client device identifier that is unique to the client device 402. In some examples, the association between the client device identifier and the authentication key is performed within the authentication key storage module 410. In other examples, the association is performed as part of a communicative interaction with the authentication system.

The authentication parameters module 412 can correspond to the authentication parameters module 312 of the authentication system 302. The authentication parameters module 412 can store authentication parameters such as, a key index parameter, a key offset parameter, a key length parameter, and a randomizer variable or function. In various examples, an authentication system may authenticate an access request by deriving a digital signature that is based on one or more authentication parameters that are transmitted from the authentication parameters module 412 of the client device 402.

The digital signature processing module 414 can correspond to the digital signature processing module 316 of the authentication system 302. In some examples, the digital signature processing module 414 can derive a digital signature using one or more authentication parameters. In some examples, the one or more authentication parameters are provided by the authentication parameters module 412 of the client device 402. In other examples, the one or more authentication parameters are provided by the authentication parameters module 312 of the authentication system 302.

Figure 5:
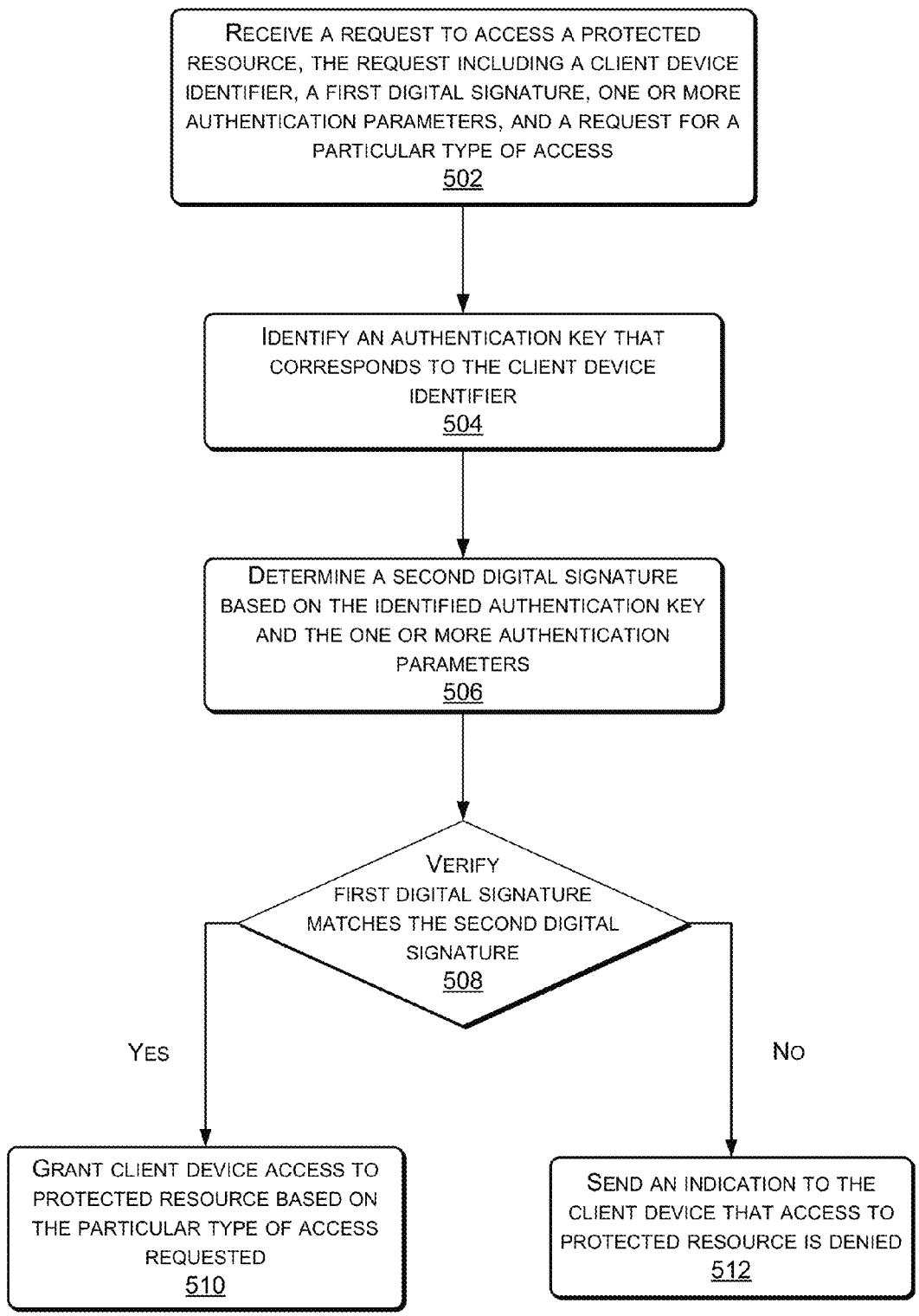
FIG. 5 illustrates an example flow of a process for granting access to a protected resource in response to receiving an access request from a client device that includes a client device identifier, a first digital signature, one or more authentication parameters, and a particular type of access request.

FIG. 5 illustrates an example flow of an authentication system that grants access to a protected resource in response to receiving an access request from a client device that includes a client device identifier, a first digital signature, one or more authentication parameters, and a particular type of access request.

At 502, the authentication system receives the access request from the client device. The access request can include a client device identifier, a first digital signature, one or more authentication parameters, and a request for a particular type of access. In this example, the authentication system can use the one or more authentication parameters from the access request to derive and validate the first digital signature provided with the access request. Further, the particular type of access may include a temporal restriction on access to the protected resource or a functional restriction on access to the protected resource. In a non-limiting example, the request for a particular type of access may involve commercial building access during working hours. In another non-limiting examples, the particular type of access may involve accessing balance information of a financial resource, or performing a financial transaction using a financial resource. In other examples, the access request for a particular type of access may include unrestricted access to the protected resource.

At 504, the authentication system identifies a shared authentication key that corresponds to the client device identifier. In various examples, an authentication system may store authentication keys associated with several, if not millions, of client devices. Thus, a client identifier can efficiently identify a particular authentication key that is associated with a particular client device. Note that a same client device may share multiple authentication keys with an authentication system. Thus by extension, a same client device may have multiple client device identifiers, because each authentication key associates a particular client device with a particular protected resource. If a client device accesses multiple protected resources, then each protected resource will likely have its own unique authentication key. Thus, the authentication system uses the client device identifier to identify a particular shared authentication key for a particular protected resource.

At 506, the authentication system derives a second digital signature using the identified authentication key, and the one or more authentication parameters provided with the access request. The one or more authentication parameters may include a key index parameter, a key offset parameter, a key length parameter, or a randomizer variable or function.

At 508, the authentication system compares the first digital signature received with the access request to the second digital signature derived by the authentication system.

At 510, in response to the authentication system verifying that the first digital signature matches the second digital signature, the authentication system can grant the client device access to the protected resource based at least in part on particular type of access included in the access request. In some examples, the authentication system may be an integrated part of the protected resource. Thus, the authentication system may simply grant the client device access to the protected resource. In other examples, the authentication system may operate independent of the protected resource. Here, the authentication system may provide the client device with a digital token that corresponds to the particular type of access identified in the access request.

At 512, if however, the authentication system determines that the first digital signature provided with the access request does not match the second digital signature that is derived by the authentication system, the authentication system can transmit an indication to the client device indicating that access to the protected resource is denied.

Figure 6:
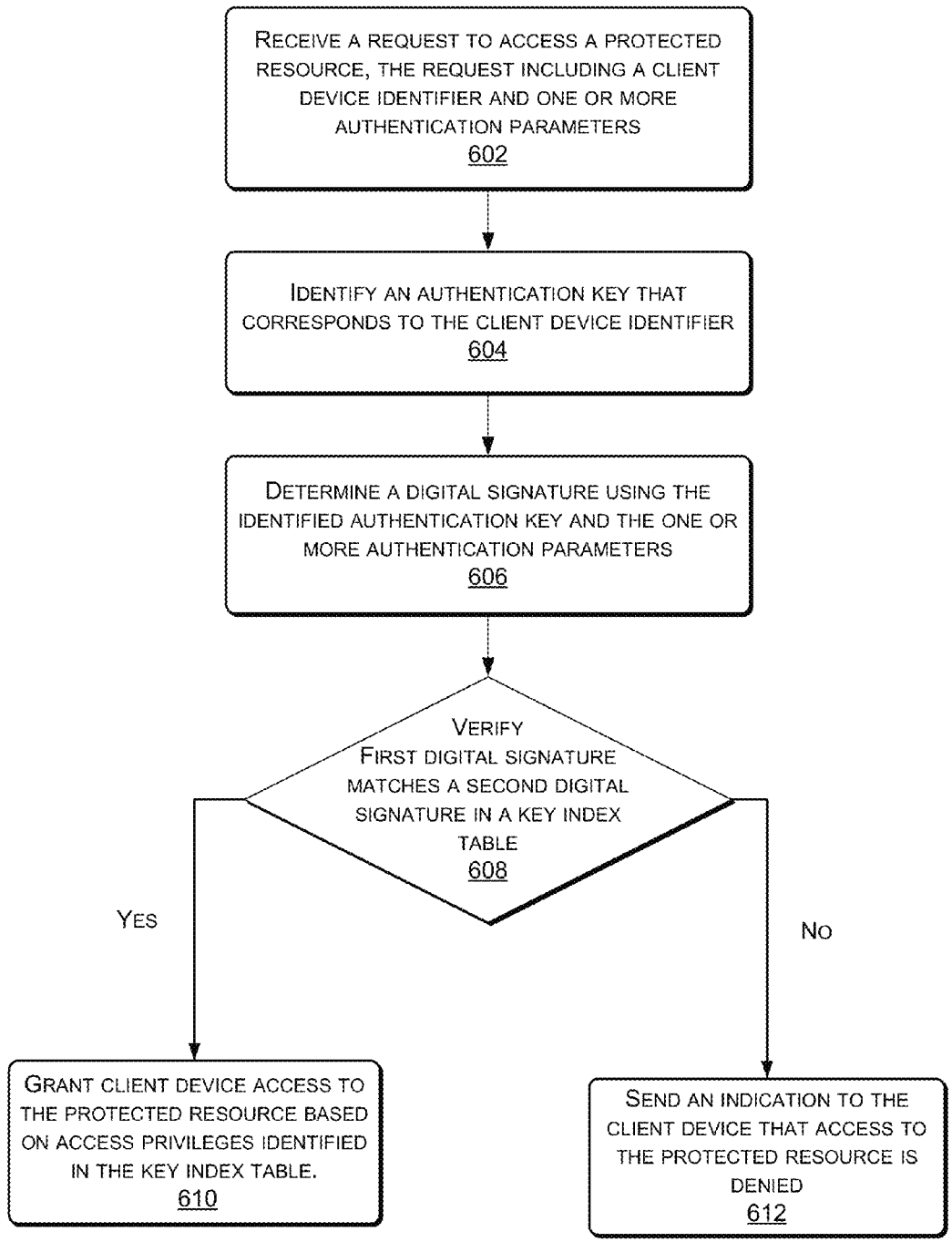
FIG. 6 illustrates an example flow of a process for granting access to a protected resource in response to receiving an access request from a client device that includes a client device identifier and one or more authentication parameters.

FIG. 6 illustrates an example flow of an authentication system that grants access to a protected resource in response to receiving an access request from a client device that includes a client device identifier and one or more authentication parameters. FIG. 6 further describes determining access privileges using a key index table.

At 602, the authentication system receives an access request from a client device. The access request can include a client device identifier and one or more authentication parameters. In this example, the authentication system can use the client device identifier to identify an authentication key that is shared between the client device and the authentication system. Further, the one or more authentication parameters can be used to derive and validate a digital signature when used in combination with an authentication key. The one or more authentication parameters may include a key index parameter, a key offset parameter, a key length parameter, or a randomizer variable or function.

At 604, the authentication system can identify an authentication key that corresponds to the client device identifier. In some cases a same client device may have multiple client device identifiers, because the client device may request access to multiple protected resources. In these cases, each protected resource will likely have its own unique authentication key. Thus, the authentication system uses the client device identifier to identify a particular shared authentication key for a particular protected resource.

At 606, the authentication system derives a digital signature using the identified authentication key and the one or more authentication parameters. The one or more authentication parameters may include a key index parameter, a key offset parameter, a key length parameter, or a randomizer variable or function.

At 608, the authentication system compares the derived digital signature with a digital signature that is stored within key index table of the authentication system. The key index table can be used to correlate derived digital signatures with access privileges associated with a protected resource. In various examples, the key index table can associate one or more digital signatures with a protected resource. The key index table can also associate a particular type of access to the protected resource. As a non-limiting example, as illustrated in FIG. 3, the digital signature "23|e<sdh" is associated with Building C (i.e. protected resource), and provides access that corresponds to "common area access only." In another example, a different digital signature "904-hjf03" is associated with the same Building C, however access is restricted to "8 am-9 am front door access."

At 610, in response to the authentication system verifying that the derived digital signature matches a digital signature within the key index table, the authentication system can grant the client device based on the type of access identified in the key index table. In some examples, the authentication system may be an integrated part of the protected resource. Thus, the authentication system may simply grant the client device access to the protected resource. In other examples, the authentication system may operate independent of the protected resource. Here, the authentication system may provide the client device with a digital token that corresponds to the particular type of access identified in the key index table.

At 612, if however, the authentication system determines that the derived digital signature does not match a digital signature listed in the key index table, the authentication system can transmit an indication to the client device indicating that access to the protected resource is denied.

Figure 7:
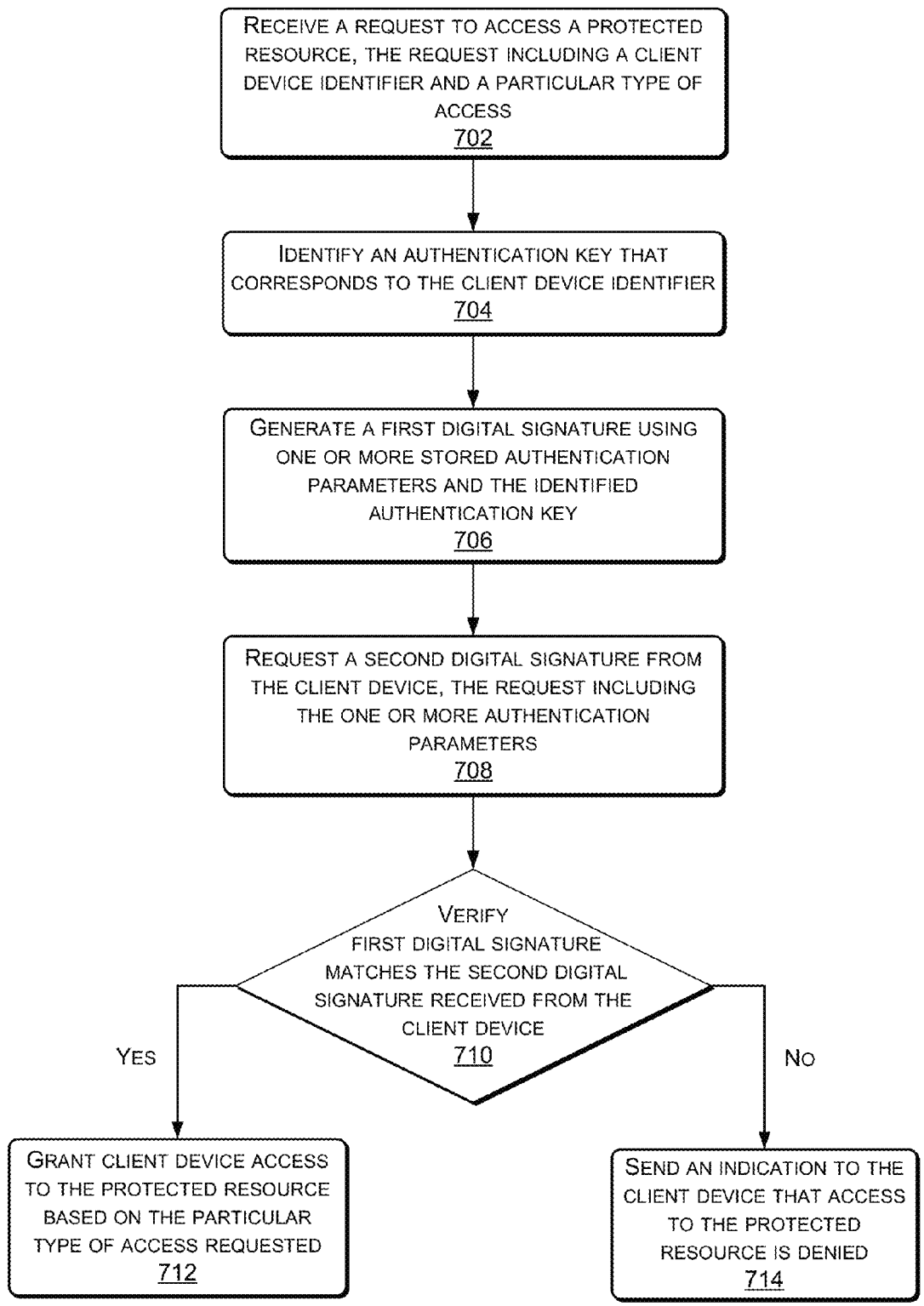
FIG. 7 illustrates an example flow of a process for granting access to a protected resource in response to receiving an access request from a client device that includes a client device, and a particular type of access request.

FIG. 7 illustrates an example flow of an authentication system that grants access to a protected resource in response to receiving an access request from a client device that includes a client device, and a particular type of access request.

At 702, the authentication system receives the access request from the client device. The access request can include a client device identifier and a request for a particular type of access. In a non-limiting example, the request for a particular type of access may include restricted access to the protected resource. For example, the particular type of access may include being able to unlock a vehicle, but not start the vehicle engine. In another non-limiting example, the request for a particular type of access may include unrestricted access to the protected resource.

At 704, the authentication system identifies a shared authentication key that corresponds to the client device identifier. In some examples, a same client device may have multiple client device identifiers, because the client device may request access to multiple protected resources. In these examples, each protected resource will likely have its own unique authentication key. Thus, the authentication system uses the client device identifier to identify a particular shared authentication key for a particular protected resource.

At 706, the authentication system can generate a first digital signature using the identified authentication key and one or more stored authentication parameters. The one or more authentication parameters may include a key index parameter, a key offset parameter, a key length parameter, or a randomizer variable or function.

At 708, the authentication system can transmit an indication to a client device, requesting a second digital signature. The request can include the one or more stored authentication parameters used by the authentication system to generate the first digital signature. An advantage of this type of authentication process is that the authentication system can change a digital signature at any time without requiring interaction with the client device. For example, to change a digital signature, the authentication system can transmit different authentication parameters to the client device, and request a digital signature that corresponds to the different authentication parameters.

At 710, the authentication system receives a second digital signature from the client device and compares the first digital signature derived by the authentication system with the second digital signature received from the client device.

At 712, in response to the authentication system verifying that the first digital signature matches the second digital signature, the authentication system can grant the client device access to the protected resource based at least in part on the particular type of access included in the access request. In some examples, the authentication system may be an integrated part of the protected resource. Thus, the authentication system may simply grant the client device access to the protected resource. In other examples, the authentication system may operate independent of the protected resource. Here, the authentication system may provide the client device with a digital token that corresponds to the particular type of access identified in the access request.

At 714, if however, the authentication system determines that the first digital signature derived by the authentication system does not match the second digital signature received from the client device, the authentication system can transmit an indication to the client device indicating that access to the protected resource is denied.

Example Clauses

Example A, a system comprising: one or more processors; memory coupled to the one or more processors, the memory including one or more modules that are executable by the one or more processors to: receive, from a client device, a request to access a protected resource, the request including at least a client device identifier and one or more authentication parameters; identify an authentication key from a plurality of authentication keys that corresponds to the client device identifier; determine a first digital signature based at least in part on the authentication key and the one or more authentication parameters; verify that the first digital signature matches a second digital signature associated with the protected resource; and grant the client device access to the protected resource.

Example B, the system of Example A, wherein the request to access the protected resource further includes the second digital signature associated with the protected resource.

Example C, the system of Example A, wherein the one or more modules are further executable by the one or more processors to identify, using a key index table, the second digital signature, and a particular type of access that is associated with the first digital signature; and wherein granting the client device access to the protected resource is based at least in part on the particular type of access that is associated with the first digital signature.

Example D, the system of Example C, wherein the key index table associates individual digital signatures with individual protected resources and particular types of access.

Example E, the system of Example C or Example D, wherein the particular type of access includes at least one of a temporal restriction of access to the protected resource or a functional restriction of access to the protected resource.

Example F, the system of Example A through Example E, wherein the one or more modules are further executable by the one or more processors to: generate an authentication key to associate with the client device identifier of the client device; and transmit the authentication key to the client device prior to receipt, from the client device, of the request to access the protected resource.

Example G, the system of Example A through F, wherein the authentication key comprises an alpha-numeric coding of environmental data at a particular geolocation, the environmental data including at least one of background radiation, background noise, physical baseband spectrum noise, or a sunlight wavelength.

Example H, the system of Example A through G, wherein the one or more authentication parameters include: a key index parameter, the key index parameter corresponding to a numerical value that identifies a character position within the authentication key that corresponds to a first character of the first digital signature; a key offset parameter, the key offset parameter corresponding to a numerical value that identifies an offset from a current character position within the authentication key to a next character position within the authentication key, a character at the next character position corresponding to a next character of the first digital signature; and a key length parameter, the key length parameter corresponding to an integer that identifies a number of characters associated with the first digital signature.

Example I, the system of Example H, wherein the one or more authentication parameters include a key index parameter and a key length parameter, and determining the first digital signature based at least in part on the authentication key and the one or more authentication parameters comprises: identifying a first character of the first digital signature as a first identified character based at least in part on the key index parameter and the authentication key; and determining the first digital signature as a number of sequential characters that proceed the first identified character based at least in part on the key length parameter and the authentication key.

Example J, the system of Example H, wherein the one or more authentication parameters include a key index parameter and a key length parameter, and determining the first digital signature based at least in part on the authentication key and the one or more authentication parameters comprises: identifying a first character of the first digital signature as a first identified character based at least in part on the key index parameter and the authentication key; and determining the first digital signature by identifying particular characters within the authentication key that proceed the first identified character, the particular characters being based at least in part on the key offset parameter and the key length parameter.

While Example A through Example J are described with respect to a system, it is understood in the context of this document that the content of Example A through Example J may also be implemented via a method, a device, and/or computer storage media.

Example K, a computer-implemented method, comprising: under control of one or more processors: receiving a request from a client device to access a protected resource, the request including at least a client device identifier; identifying an authentication key from a plurality of authentication keys that corresponds to the client device identifier; generating one or more authentication parameters to associate with the authentication key; determining a first digital signature based at least in part on the authentication key and the one or more authentication parameters; transmitting, to the client device, an indication that includes the one or more authentication parameters, the indication further requesting a second digital signature that is based on the one or more authentication parameters; receiving, from the client device, the second digital signature; and in response to verifying that the first digital signature matches the second digital signature, granting the client device access to the protected resource.

Example L, the computer-implemented method of Example K, wherein the one or more authentication parameters are based at least in part on a numeric coding of an independent parameter, the independent parameter including at least one of a current date or a current time.

Example M, the computer-implemented method of Example K or Example L, wherein the request for access to the protected resource further includes a request for a particular type of access to the protected resource; and wherein granting the client device access to the protected resource is based at least in part on the particular type of access that is included in the request for access, the particular type of access corresponding to at least one of a temporal restriction of access to the protected resource or a functional restriction of access to the protected resource.

Example N, the computer-implemented method of Example K through Example M, wherein the one or more authentication parameters include: a key index parameter, the key index parameter corresponding to a numerical value that identifies a character position within the authentication key that corresponds to a first character of the first digital signature; a key offset parameter, the key offset parameter corresponding to a numerical value that identifies an offset from a current character position within the authentication key to a next character position within the authentication key, a character at the next character position corresponding to a next character of the first digital signature; and a key length parameter, the key length parameter corresponding to an integer that identifies a number of characters associated with the first digital signature.

Example O, the computer-implemented method of Example N, wherein determining the first digital signature based at least in part on the authentication key and the one or more authentication parameters further comprises: identifying a first character of the first digital signature as a first identified character based at least in part on the key index parameter and the authentication key; and determining the first digital signature by identifying particular characters within the authentication key that proceed the first identified character, the particular characters being based at least in part on the key offset parameter and the key length parameter.

While Example K through Example O are described with respect to a computer-implemented method, it is understood in the context of this document that the content of Example K through Example O may also be implemented via a system, a device, and/or computer storage media.

Example P, a computer-implemented method, comprising: under control of one or more processors: transmitting, by a client device, to an authentication system associated with a protected resource, a request to access the protected resource, the request including at least a client device identifier; receiving, by the client device and from the authentication system, one or more authentication parameters, and a request for a digital signature that corresponds to the request to access the protected resource; identifying, by the client device, an authentication key from a plurality of authentication keys that corresponds to the protected resource; determining, by the client device, the digital signature based at least in part on the authentication key and the one or more authentication parameters; transmitting, by the client device to the authentication system, an indication that includes the digital signature; and in response to a verification of the digital signature by the authentication system, receiving, by the client device, a grant of access to the protected resource.

Example Q, the computer-implemented method of Example P, wherein the authentication system is independent of the protected resource, and receiving, by the client device, the grant of access to the protected resource further comprises, receiving, by the client device, a secure token that authorizes access to the protected resource.

Example R, the computer-implemented method of Example P or Example Q, wherein individual ones of the plurality of authentication keys correspond to individual ones of a plurality of protected resources, and wherein the client device identifier associates the client device with the authentication key and with the protected resource.

Example S, the computer-implemented method of Example P through Example R, further comprising: generating, by the client device, the authentication key to associate with the client device identifier and the protected resource; and transmitting the authentication key to the authentication system prior to transmitting to the authentication system the request to access the protected resource.

Example T, the computer-implemented method of Example P through Example S, wherein the authentication key comprises an alpha-numeric coding, by the client device, of at least one of individual pixels in a particular digital photo, a section of text from a particular publication, or an audio excerpt from a particular digital recording.

While Example P through Example T are described with respect to a computer-implemented method, it is understood in the context of this document that the content of Example P through Example T may also be implemented via a system, a device, and/or computer storage media.

CONCLUSION

Although the subject matter has been described in language specific to structural features and/or methodological acts, it is to be understood that the subject matter defined in the appended claims is not necessarily limited to the specific features or acts described herein. Rather, the specific features and acts are disclosed as illustrative forms of implementing the claims.

What is claimed:

1. A system comprising:
one or more processors;
memory coupled to the one or more processors, the memory including one or more modules that are executable by the one or more processors to:
receive, from a client device, a request to access a protected resource, the request including at least a client device identifier and one or more authentication parameters, wherein the one or more authentication parameters include a key index parameter, a key offset parameter, or a key length parameter, wherein:
the key index parameter corresponding to a numerical value that identifies a character position within an authentication key that corresponds to a first character of a first digital signature,
the key offset parameter corresponding to a key offset parameter that corresponds to a numerical value that identifies an offset from a current character position within the authentication key to a next character position within the authentication key, a character at the next character position corresponding to a next character of the first digital signature, and
the key length parameter corresponding to an integer that identifies a number of characters associated with the first digital signature;
identify the authentication key from a plurality of authentication keys, based at least in part on the client device identifier;
determine the first digital signature based at least in part on the authentication key and the one or more authentication parameters;
verify that the first digital signature matches a second digital signature associated with the protected resource; and
grant the client device with access to the protected resource.

2. The system of claim 1, wherein the request to access the protected resource further includes the second digital signature associated with the protected resource.

3. The system of claim 1, wherein the one or more modules are further executable by the one or more processors to identify, using a key index table, the second digital signature, and a particular type of access that is associated with the first digital signature; and
wherein granting the client device with access to the protected resource is based at least in part on the particular type of access that is associated with the first digital signature.

4. The system of claim 3, wherein the key index table associates individual digital signatures with individual protected resources and particular types of access.

5. The system of claim 3, wherein the particular type of access includes at least one of a temporal restriction of access to the protected resource or a functional restriction of access to the protected resource.

6. The system of claim 1, wherein the one or more modules are further executable by the one or more processors to:
generate an authentication key to associate with the client device identifier of the client device; and
transmit the authentication key to the client device prior to receipt, from the client device, of the request to access the protected resource.

7. The system of claim 1, wherein the authentication key comprises an alpha-numeric coding of environmental data at a particular geolocation, the environmental data including at least one of background radiation, background noise, physical baseband spectrum noise, or a sunlight wavelength.

8. The system of claim 1, wherein determining the first digital signature based at least in part on the authentication key and the one or more authentication parameters comprises:
identifying a first character of the first digital signature as a first identified character based at least in part on the key index parameter and the authentication key; and
determining the first digital signature as a number of sequential characters that proceed the first identified character based at least in part on the key length parameter and the authentication key.

9. The system of claim 1, wherein determining the first digital signature based at least in part on the authentication key and the one or more authentication parameters comprises:
identifying a first character of the first digital signature as a first identified character based at least in part on the key index parameter and the authentication key; and
determining the first digital signature by identifying particular characters within the authentication key that proceed the first identified character, the particular characters being based at least in part on the key offset parameter and the key length parameter.

10. The system of claim 1, wherein determining the first digital signature based at least in part on the authentication key and the one or more authentication parameters comprising:
identifying a first character of the first digital signature as a first identified character based at least in part on the key index parameter and the authentication key; and
determining the first digital signature by identifying particular characters within the authentication key that proceed the first identified character.

11. The system of claim 1, wherein determining the first digital signature based at least in part on the authentication key and the one or more authentication parameters comprising:
identifying a first character of the first digital signature as a first identified character based at least in part on the key index parameter and the authentication key; and
determining the first digital signature by identifying particular characters within the authentication key that proceed the first identified character, the particular characters being based at least in part on the key offset parameter.

12. A computer-implemented method, comprising:
under control of one or more processors:
receiving a request from a client device to access a protected resource, the request including at least a client device identifier;

identifying an authentication key from a plurality of authentication keys that corresponds to the client device identifier;

generating one or more authentication parameters to associate with the authentication key, the one or more authentications parameters including a key index parameter, a key offset parameter, and a key length parameter, wherein:

the key index parameter corresponding to a numerical value that identifies a character position within the authentication key that corresponds to a first character of a first digital signature, the key offset parameter corresponding to a numerical value that identifies an offset from a current character position within the authentication key to a next character position within the authentication key, a character at the next character position corresponding to a next character of the first digital signature, and the key length parameter corresponding to an integer that identifies a number of characters associated with the first digital signature;

determining the first digital signature based at least in part on the authentication key and the one or more authentication parameters;

transmitting, to the client device, an indication that includes the one or more authentication parameters, the indication further requesting a second digital signature that is based on the one or more authentication parameters;

receiving, from the client device, the second digital signature; and in response to verifying that the first digital signature matches the second digital signature, granting the client device with access to the protected resource.

13. The computer-implemented method of claim 12, wherein the one or more authentication parameters are based at least in part on a numeric coding of an independent parameter, the independent parameter including at least one of a current date or a current time.

14. The computer-implemented method of claim 12, wherein the request for access to the protected resource further includes a request for a particular type of access to the protected resource; and wherein granting the client device with access to the protected resource is based at least in part on the particular type of access that is included in the request for access, the particular type of access corresponding to at least one of a temporal restriction of access to the protected resource or a functional restriction of access to the protected resource.

15. The computer-implemented method of claim 12, wherein determining the first digital signature based at least in part on the authentication key and the one or more authentication parameters further comprises:

identifying a first character of the first digital signature as a first identified character based at least in part on the key index parameter and the authentication key; and determining the first digital signature by identifying particular characters within the authentication key that proceed the first identified character, the particular characters being based at least in part on the key offset parameter and the key length parameter.

16. A computer-implemented method, comprising:
under control of one or more processors:

transmitting, by a client device, to an authentication system associated with a protected resource, a request to access the protected resource, the request including at least a client device identifier;

receiving, by the client device and from the authentication system, one or more authentication parameters, and a request for a digital signature that corresponds to the request to access the protected resource, the one or more authentication parameters including a key index parameter, a key offset parameter, and a key length parameter, wherein:

the key index parameter corresponding to a numerical value that identifies a character position within an authentication key that corresponds to a first character of the digital signature, the key offset parameter corresponding to a numerical value that identifies an offset from a current character position within the authentication key to a next character position within the authentication key, a character at the next character position corresponding to a next character of the digital signature, and the key length parameter corresponding to an integer that identifies a number of characters associated with the digital signature;

identifying, by the client device, an authentication key from a plurality of authentication keys that corresponds to the protected resource;

determining, by the client device, the digital signature based at least in part on the authentication key and the one or more authentication parameters;

transmitting, by the client device to the authentication system, an indication that includes the digital signature; and in response to a verification of the digital signature by the authentication system, receiving, by the client device, a grant of access to the protected resource.

17. The computer-implemented method of claim 16, wherein the authentication system is independent of the protected resource, and receiving, by the client device, the grant of access to the protected resource further comprises, receiving, by the client device, a secure token that authorizes access to the protected resource.

18. The computer-implemented method of claim 16, wherein individual ones of the plurality of authentication keys correspond to individual ones of a plurality of protected resources, and wherein the client device identifier associates the client device with the authentication key and with the protected resource.

19. The computer-implemented method of claim 16, further comprising:

generating, by the client device, the authentication key to associate with the client device identifier and the protected resource; and transmitting the authentication key to the authentication system prior to transmitting to the authentication system the request to access the protected resource.

20. The computer-implemented method of claim 16, wherein the authentication key comprises an alpha-numeric coding, by the client device, of at least one of individual pixels in a particular digital photo, a section of text from a particular publication, or an audio excerpt from a particular digital recording.

* * * * *